US006975239B2

(12) United States Patent
Young et al.

(10) Patent No.: US 6,975,239 B2
(45) Date of Patent: Dec. 13, 2005

(54) VEHICLE OCCUPANT SENSING SYSTEM HAVING CIRCUIT CARRIER TRAY

(75) Inventors: Oliver Young, Grosse Pointe Farms, MI (US); John F. Nathan, White Lake Township, MI (US); Christopher T. Ricard, Rochester, MI (US); Mark Sebby, Brighton, MI (US)

(73) Assignee: Lear Corporation, Southfield, MI (US)

( * ) Notice: Subject to any disclaimer, the term of this patent is extended or adjusted under 35 U.S.C. 154(b) by 147 days.

(21) Appl. No.: 10/749,169

(22) Filed: Dec. 30, 2003

(65) Prior Publication Data

US 2004/0262961 A1  Dec. 30, 2004

Related U.S. Application Data

(63) Continuation-in-part of application No. 10/606,649, filed on Jun. 26, 2003.

(51) Int. Cl.[7] .............................................. G08B 71/00
(52) U.S. Cl. ................... 340/667; 180/271; 280/735; 280/806; 701/45
(58) Field of Search ................ 340/667; 180/271; 280/735, 806; 701/45

(56) References Cited

U.S. PATENT DOCUMENTS

| 5,404,128 A | 4/1995 | Ogino et al. ............. 340/425.5 |
| 5,413,378 A | 5/1995 | Steffens, Jr. et al. ........ 280/735 |
| 5,474,327 A | 12/1995 | Schousek ..................... 280/735 |
| 5,485,000 A | 1/1996 | Schneider ..................... 235/494 |
| 5,570,903 A | 11/1996 | Meister et al. ............... 280/735 |
| 5,594,222 A | 1/1997 | Caldwell ..................... 200/600 |
| 5,653,462 A | 8/1997 | Breed et al. ................. 280/735 |
| 5,694,320 A | 12/1997 | Breed ................... 364/424.055 |
| 5,731,781 A | 3/1998 | Reed ........................... 342/135 |
| 5,739,757 A | 4/1998 | Gioutsos ...................... 340/667 |
| 5,748,473 A | 5/1998 | Breed et al. ........... 364/424.055 |
| 5,810,392 A | 9/1998 | Gagnon ....................... 280/735 |
| 5,822,707 A | 10/1998 | Breed et al. ................... 701/49 |
| 5,829,782 A | 11/1998 | Breed et al. ................. 280/735 |
| 5,835,613 A | 11/1998 | Breed et al. ................. 382/100 |
| 5,848,802 A | 12/1998 | Breed et al. ................. 280/735 |
| 5,877,677 A | 3/1999 | Fleming et al. ............. 340/436 |
| 5,890,758 A | 4/1999 | Pone et al. ................... 297/15 |
| 5,901,978 A | 5/1999 | Breed et al. ................. 280/735 |
| 5,931,254 A | 8/1999 | Loraas et al. ............... 180/272 |
| 5,931,527 A | 8/1999 | D'Onofrio et al. ......... 297/146 |

(Continued)

FOREIGN PATENT DOCUMENTS

EP          0 689 967 A1    3/1996

(Continued)

Primary Examiner—Daniel Wu
Assistant Examiner—Samuel J. Walk
(74) Attorney, Agent, or Firm—Bliss McGlynn, P.C.

(57) ABSTRACT

A vehicle occupant sensing system for detecting a condition of a vehicle seat assembly having a lower seat cushion supported by a seat pan. The system has a tray with a plurality of pedestals disposed between the seat pan and the cushion. The system also has a plurality of sensor assemblies, each defining a force responsive axis and disposed between the lower seat cushion and tray. The pedestals support some of the sensor assemblies such that the force responsive axes of the sensor assemblies are substantially aligned with the occupant's weight load. Furthermore, the system may be employed in a seat assembly to detect a condition thereof. The tray allows addition of safety features in the vehicle seat assembly such that the seat more effectively retains the occupant, and yet the tray positions the sensor assemblies to be responsively aligned with the occupant's weight load despite these additional features.

18 Claims, 2 Drawing Sheets

U.S. PATENT DOCUMENTS

| | | | | |
|---|---|---|---|---|
| 5,943,295 | A | 8/1999 | Varga et al. | 367/99 |
| 5,954,398 | A | 9/1999 | Namba et al. | 297/257 |
| 5,971,432 | A | 10/1999 | Gagnon et al. | 280/735 |
| 5,975,612 | A | 11/1999 | Macey et al. | 296/66 |
| 6,012,007 | A | 1/2000 | Fortune et al. | 701/45 |
| 6,020,812 | A | 2/2000 | Thompson et al. | 340/438 |
| 6,027,138 | A | 2/2000 | Tanaka et al. | 280/735 |
| 6,030,038 | A | 2/2000 | Namba et al. | 297/257 |
| 6,039,139 | A | 3/2000 | Breed et al. | 180/271 |
| 6,043,743 | A | 3/2000 | Saito et al. | 340/562 |
| 6,045,405 | A | 4/2000 | Geltsch et al. | 439/620 |
| 6,056,079 | A | 5/2000 | Cech et al. | 180/273 |
| 6,059,358 | A | 5/2000 | Demick et al. | 297/188.04 |
| 6,078,854 | A | 6/2000 | Breed et al. | 701/49 |
| 6,079,763 | A | 6/2000 | Clemente | 296/65.05 |
| 6,081,757 | A | 6/2000 | Breed et al. | 701/45 |
| 6,088,640 | A | 7/2000 | Breed | 701/45 |
| 6,089,641 | A | 7/2000 | Mattarella et al. | 296/64 |
| 6,101,436 | A | 8/2000 | Fortune et al. | 701/45 |
| 6,102,463 | A | 8/2000 | Swanson et al. | 296/37.15 |
| 6,116,639 | A | 9/2000 | Breed et al. | 280/735 |
| 6,129,168 | A | 10/2000 | Lotito et al. | 180/273 |
| 6,129,404 | A | 10/2000 | Mattarella et al. | 296/65.09 |
| 6,134,492 | A | 10/2000 | Breed et al. | 701/49 |
| 6,138,067 | A | 10/2000 | Cobb et al. | 701/45 |
| 6,141,432 | A | 10/2000 | Breed et al. | 382/100 |
| 6,168,198 | B1 | 1/2001 | Breed et al. | 280/735 |
| 6,186,537 | B1 | 2/2001 | Breed et al. | 280/735 |
| 6,220,627 | B1 | 4/2001 | Stanley | 280/735 |
| 6,234,519 | B1 | 5/2001 | Breed | 280/735 |
| 6,234,520 | B1 | 5/2001 | Breed et al. | 280/735 |
| 6,242,701 | B1 | 6/2001 | Breed et al. | 177/144 |
| 6,250,671 | B1 | 6/2001 | Osmer et al. | 280/735 |
| 6,250,672 | B1 | 6/2001 | Ryan et al. | 280/735 |
| 6,253,134 | B1 | 6/2001 | Breed et al. | 701/49 |
| RE37,260 | E | 7/2001 | Varga et al. | 367/99 |
| 6,254,127 | B1 | 7/2001 | Breed et al. | 280/735 |
| 6,270,116 | B1 | 8/2001 | Breed et al. | 280/735 |
| 6,279,946 | B1 | 8/2001 | Johnson et al. | 280/734 |
| 6,283,503 | B1 | 9/2001 | Breed et al. | 280/735 |
| 6,323,444 | B1 | 11/2001 | Aoki | 177/144 |
| 6,324,453 | B1 | 11/2001 | Breed et al. | 701/45 |
| 6,325,414 | B2 | 12/2001 | Breed et al. | 280/735 |
| 6,330,501 | B1 | 12/2001 | Breed et al. | 701/49 |
| 6,342,683 | B1 | 1/2002 | Aoki et al. | 177/144 |
| 6,353,394 | B1 | 3/2002 | Maeda et al. | 340/667 |
| 6,393,133 | B1 | 5/2002 | Breed et al. | 382/100 |
| 6,394,490 | B2 | 5/2002 | Osmer et al. | 280/735 |
| 6,397,136 | B1 | 5/2002 | Breed et al. | 701/45 |
| 6,407,347 | B1 | 6/2002 | Blakesley | 177/144 |
| 6,412,813 | B1 | 7/2002 | Breed et al. | 280/735 |
| 6,416,080 | B1 | 7/2002 | Gillis et al. | 280/735 |
| 6,422,595 | B1 | 7/2002 | Breed et al. | 280/735 |
| 6,442,465 | B2 | 8/2002 | Breed et al. | 701/45 |
| 6,442,504 | B1 | 8/2002 | Breed et al. | 702/173 |
| 6,445,988 | B1 | 9/2002 | Breed et al. | 701/45 |
| 6,452,870 | B1 | 9/2002 | Breed et al. | 367/99 |
| 6,457,545 | B1 | 10/2002 | Michaud et al. | 180/272 |
| 6,474,739 | B1 | 11/2002 | Lagerweij | 297/341 |
| 6,476,514 | B1 | 11/2002 | Schondorf | 307/10.1 |
| 6,506,069 | B2 | 1/2003 | Babala et al. | 439/248 |
| 6,605,877 | B1 | 8/2003 | Patterson et al. | 307/10.1 |
| 6,609,054 | B2 | 8/2003 | Wallace | 701/45 |
| 2002/0003345 | A1 | 1/2002 | Stanley et al. | 280/735 |
| 2002/0056975 | A1 | 5/2002 | Yoon et al. | 280/735 |
| 2002/0079728 | A1 | 6/2002 | Tame | 297/344.1 |
| 2002/0098730 | A1 | 7/2002 | Babala et al. | 439/248 |
| 2002/0195807 | A1 | 12/2002 | Ishida | 280/735 |
| 2003/0040858 | A1 | 2/2003 | Wallace | 701/45 |
| 2003/0071479 | A1 | 4/2003 | Schaller et al. | 296/136 |
| 2003/0090133 | A1 | 5/2003 | Nathan et al. | 297/217.3 |
| 2003/0106723 | A1 | 6/2003 | Thakur et al. | 177/144 |
| 2003/0111276 | A1 | 6/2003 | Kajiyama | 177/144 |
| 2003/0164715 | A1 | 9/2003 | Lester | 324/661 |
| 2003/0171036 | A1 | 9/2003 | Aujla et al. | 439/660 |
| 2003/0189362 | A1 | 10/2003 | Lichtinger et al. | 297/217.3 |
| 2003/0196495 | A1 | 10/2003 | Saunders et al. | 73/862.041 |
| 2003/0220766 | A1 | 11/2003 | Saunders et al. | 702/173 |

FOREIGN PATENT DOCUMENTS

| | | |
|---|---|---|
| WO | WO 98/41424 | 3/1997 |

VEHICLE OCCUPANT SENSING SYSTEM HAVING CIRCUIT CARRIER TRAY

CROSS-REFERENCE TO RELATED APPLICATIONS

This application is a continuation-in-part of U.S. Ser. No. 10/606,649, entitled "Encapsulated Spring Sensor Assembly" and filed Jun. 26, 2003.

BACKGROUND OF THE INVENTION

1. Field of the Invention

The present invention relates generally to vehicle occupant sensing systems and, more specifically, to such a system having a circuit carrier tray adapted to properly orient a plurality of sensor assemblies.

2. Description of the Related Art

Automotive vehicles employ seating systems that accommodate the passengers of the vehicle. The seating systems include restraint systems that are calculated to restrain and protect the occupants in the event of a collision. The primary restraint system commonly employed in most vehicles today is the seatbelt. Seatbelts usually include a lap belt and a shoulder belt that extends diagonally across the occupant's torso from one end of the lap belt to a mounting structure located proximate to the occupant's opposite shoulder.

In addition, automotive vehicles may include supplemental restraint systems. The most common supplemental restraint system employed in automotive vehicles today is the inflatable airbag. In the event of a collision, the airbags are deployed as an additional means of restraining and protecting the occupants of the vehicle. Originally, the supplemental inflatable restraints (airbags) were deployed in the event of a collision whether or not any given seat was occupied. These supplemental inflatable restraints and their associated deployment systems are expensive and over time this deployment strategy was deemed not to be cost effective. Thus, there became a recognized need in the art for a means to selectively control the deployment of the airbags such that deployment occurs only when the seat is occupied.

Partially in response to this need, vehicle safety systems have been proposed that include vehicle occupant sensing systems capable of detecting whether or not a given seat is occupied. The systems act as a switch in controlling the deployment of a corresponding air bag. As such, if the occupant sensing device detects that a seat is unoccupied during a collision, it can prevent the corresponding air bag from deploying, thereby saving the vehicle owner the unnecessary cost of replacing the expended air bag.

Furthermore, many airbag deployment forces and speeds have generally been optimized to restrain one hundred eighty pound males because the one hundred eighty pound male represents the mean average for all types of vehicle occupants. However, the airbag deployment force and speed required to restrain a one hundred eighty pound male exceeds that which are required to restrain smaller occupants, such as some females and small children. Thus, there became a recognized need in the art for occupant sensing systems that could be used to selectively control the deployment of the airbags when a person below a predetermined weight occupies the seat.

Accordingly, other vehicle safety systems have been proposed that are capable of detecting the weight of an occupant. In one such air bag system, if the occupant's weight falls below a predetermined level, then the system can suppress the inflation of the air bag or will prevent the air bag from deploying at all. This reduces the risk of injury that the inflating air bag could otherwise cause to the smaller-sized occupant.

One necessary component of each of the known systems discussed above includes some means for sensing the presence of the vehicle occupant in the seat. One such means may include a sensor device supported within the lower seat cushion of the vehicle seat. For example, U.S. published patent application having U.S. Ser. No. 10/249,527 and Publication No. US2003/0196495 A1 filed in the name of Saunders et al. discloses a method and apparatus for sensing seat occupancy including a sensor/emitter pair that is supported within a preassembled one-piece cylinder-shaped housing. The housing is adapted to be mounted within a hole formed in the seat cushion and extending from the B-surface toward the A-surface of the seat cushion. The sensor/emitter pair supported in the housing includes an emitter that is mounted within the seat cushion and spaced below the upper or A-surface of the seat cushion. In addition, the sensor is also supported by the housing within the seat cushion but spaced below the emitter. The cylindrical housing is formed of a compressible, rubber-like material that is responsive to loads placed on the upper surface of the seat cushion. The housing compresses in response to a load on the seat cushion. The load is detected through movement of the emitter toward the sensor as the housing is compressed. The housing is sufficiently resilient to restore the emitter to full height when no load is applied to the upper surface of the seat cushion. The Saunders et al. system also includes a processor for receiving the sensor signals and interpreting the signals to produce an output to indicate the presence of an occupant in the seat.

While the Saunders et al. occupant seat sensing system teaches a sensor/emitter pair that may sense the presence of a vehicle seat occupant, it suffers from certain disadvantages associated with the fact that it is mounted within the seat cushion of the vehicle seat. For example, vehicle seat cushions typically employ a foam or other cushiony material of a predetermined thickness. The thickness of this material is preferably calculated to provide adequate comfort for the occupant. However, with the housings of the sensor/emitter pairs mounted within the cushion, the occupant may feel one or more of the housings through the seat cushion. This is especially true over time as the seat cushion becomes worn. Furthermore, while the compressible, rubber-like housing taught by Saunders et al. is generally responsive to forces extending along the length of its axis, is also subject to transverse or "shear" forces acting through the seat cushion. Thus, the housing can be deformed in an irregular manner resulting in false readings generated by the sensor/emitter pair.

In addition to providing occupant restraint systems, vehicle seats must satisfy governmental motor vehicle safety standards, such as those found in 49 C.F.R. §§ 571.207–208 (2003). Particularly, some safety standards address the seat's ability to retain an occupant in the seat during a collision. In partial response to such standards, vehicle seat manufacturers angle the front portion of the lower seat cushion and the seat pan that supports the lower seat cushion. These components are angled toward the occupant such that they bear some of the occupant's forward inertial load in the event of a sudden deceleration. In some cases, however, angling the front portion of the seat pan can cause the sensing means to be subject to excessive shear loading. Such loading may inhibit the operation of these sensor assemblies and can result in a false reading.

Therefore, there is an ongoing need in the art for a circuit carrier tray for a vehicle occupant sensing system that acts to properly orient the sensing means such that the sensing means is receptive primarily to axial weight loads regardless of the angularity of the seat pan on which it is positioned so as to ensure proper detection of occupants in the vehicle seat.

SUMMARY OF THE INVENTION

The present invention overcomes the disadvantages of the related art in a vehicle occupant sensing system for detecting a condition of a vehicle seat assembly. The vehicle seat assembly has a lower seat cushion on which an occupant can apply an axial load directed generally through the lower seat cushion. A seat pan supports the lower seat cushion. The vehicle occupant sensing system has a tray adapted to be disposed between the seat pan and the cushion. The tray includes a plurality of pedestals formed thereon. The vehicle occupant sensing system also has a plurality of sensor assemblies operatively disposed between the lower seat cushion and the tray. Each of the sensor assemblies defines a force responsive axis, and the sensor assemblies are responsive to the condition of the vehicle seat assembly. At least some of the sensor assemblies are supported by corresponding ones of the plurality of pedestals such that the force responsive axes of the sensor assemblies are substantially aligned with the axial load applied by the occupant. Furthermore, the vehicle occupant sensing system may be employed in a vehicle seat assembly to detect a condition thereof.

One advantage of the present invention is that by aligning the sensor assemblies with the axial weight load applied by the occupant, the tray reduces the detrimental effects of shear loading on the sensor assemblies. As such, the sensor assemblies can respond more accurately to the presence of an occupant in the vehicle seat assembly. Thus, the tray allows the addition of safety features in the vehicle seat assembly such that the seat more effectively retains the occupant, and yet the tray positions the sensor assemblies to be responsively aligned with the occupant's weight load despite these additional safety features.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
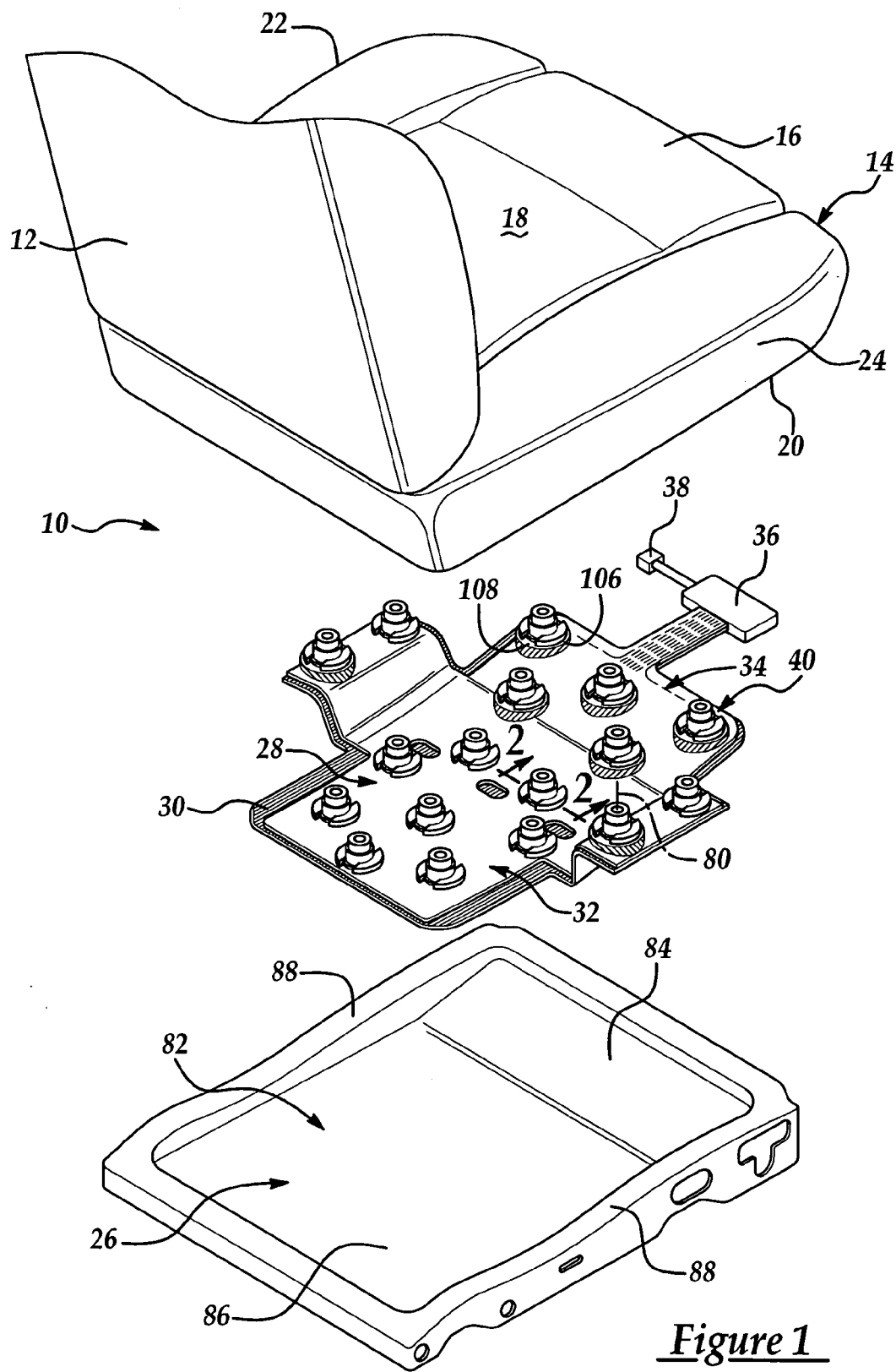
FIG. 1 is an exploded perspective view of a vehicle seat assembly with one embodiment of a vehicle occupant sensing system having a circuit carrier tray.

Referring now to the drawings, where like numerals are used to designate like structure throughout the figures, an exploded view of one embodiment of the vehicle seat assembly of the present invention is generally indicated at 10 in FIG. 1. The vehicle seat assembly 10 includes a seat back, generally indicated at 12, and a lower seat assembly, generally indicated at 14. The lower seat assembly 14 has a seat cushion 16 that defines an upper surface 18, and a lower surface 20 that is spaced from the upper surface 18. The upper surface 18 of the seat cushion 16 may be referred to as the "A-surface" and the lower surface 20 may be referred to as the "B-surface." The seat cushion 16 also defines an inboard side 22 and an outboard side 24. When an occupant (not shown) is supported on the lower seat assembly 14, the weight of the occupant will apply an axial load directed generally through the upper surface 18 of the seat cushion 16 toward the lower surface 20. Although the weight of the occupant will induce an axial as well as shear forces in the seat cushion 16, those having ordinary skill in the art will recognize that the primary load path of the occupant's weight will be substantially vertical from the upper surface 18 toward the lower surface 20, through the seat cushion 16.

The lower seat assembly 14 also includes a seat pan, generally indicated at 26. The seat pan 26 is generally disposed beneath the lower surface 18 so as to support the seat cushion 16. In turn, the seat pan 26 is operatively supported relative to the floor of the vehicle using any suitable structure of the type commonly known in the art, such as a seat track (not shown). In addition, the vehicle seat assembly 10 includes a vehicle occupant sensing system, generally indicated at 28. The vehicle occupant sensing system 28 is used for detecting a condition of the vehicle seat assembly 10, such as whether or not the vehicle seat assembly 10 is occupied, whether the occupant is above or below a certain weight requirement or whether the occupant is sitting in a certain position.

The sensing system 28 includes a circuit carrier tray, generally indicated at 30, that is supported by the seat pan 26. The tray 30 supports components of the vehicle occupant sensing system 28 as will be described in greater detail below. The vehicle occupant sensing system 28 also includes a circuit carrier, generally indicated at 32, which is disposed adjacent the lower surface 20 of the seat cushion 16. The tray 30 supports the circuit carrier 32. In addition, the vehicle occupant sensing system 28 includes an electric circuit, generally indicated at 34, which in turn, is supported by the circuit carrier 32. The circuit carrier 32 is made of a thin nonconductive and corrosion-resistant material, and it encapsulates known electrical components that form the electric circuit 34. For instance, in one embodiment, a flexible printed circuit forms the circuit carrier 32 and electric circuit 34.

The electric circuit 34 is electrically connected to a controller schematically illustrated at 36. As described in greater detail below, the electric circuit 34 carries electric signals generated by the vehicle occupant sensing system 28 to the controller 36. The controller 36 is electrically attached to a restraint system, schematically illustrated at 38. The restraint system 38 can be of many types, such as an air bag system, and the controller 36 sends output to the restraint system 38 based on the signals delivered by the electric circuit 34. Although an airbag restraint system is discussed here, one having ordinary skill in the art will recognize that the type of restraint system 38 connected to the controller 36 does not limit the scope of the present invention.

Figure 2:
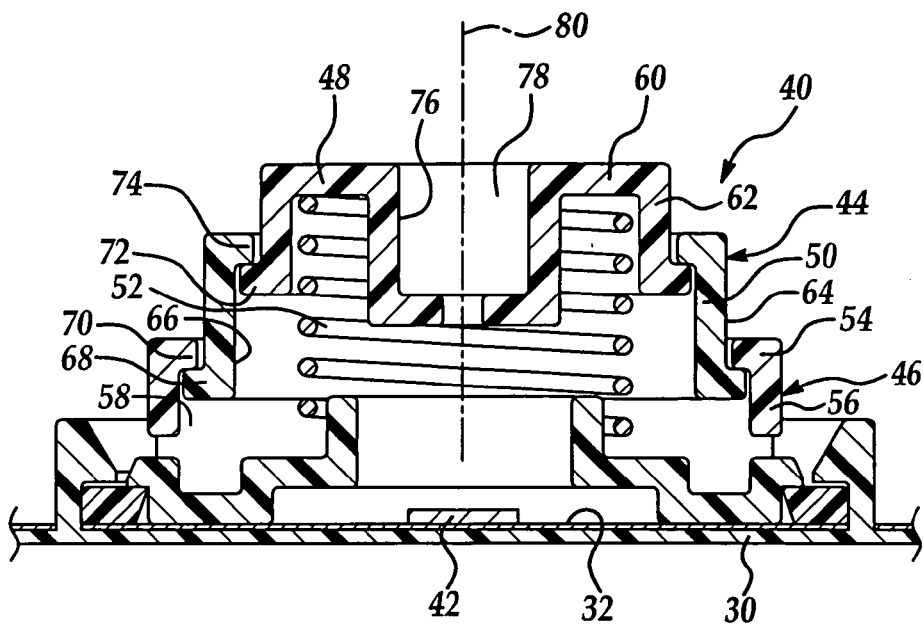
FIG. 2 is a cross sectional view of the vehicle occupant sensing system of FIG. 1 taken along the line 2—2.

As shown in FIGS. 1 and 2, the system 28 also includes a plurality of low profile sensor assemblies, generally indicated at 40. The sensor assemblies 40 are supported by the tray 30, below the lower surface 20 of the seat cushion 16. In one embodiment not shown, the lower surface 20 includes a plurality of depressions, and each of the low profile sensor assemblies 40 are spaced according to a corresponding depression formed in the lower surface 20 of the seat cushion 16.

A sensor, generally indicated at 42, is operatively fixed relative to each of the low profile sensor assemblies 40. The sensor 42 is in electrical communication with the electric circuit 34. The low profile sensor assemblies 40 each cooperatively operate with the associated sensors 42 to detect a condition of the vehicle seat 10 as will be described in greater detail below. For example, the low profile sensor assemblies 40 and sensors 42 can operate to detect that the vehicle seat 10 is unoccupied, is occupied by a person of a particular weight, or is occupied by a person sitting in a particular position. The sensor 42 and its method of attachment can be one of a type described in applicant's co-pending application entitled "Vehicle Occupant Sensing System and Method of Electrically Attaching a Sensor to an Electrical Circuit," Ser. No. 19/748,514, which is herein incorporated by reference in its entirety.

As will be discussed in greater detail below, the sensor assemblies 40 have a relatively low profile and can collapse in a more compact manner than similar sensor assemblies of the prior art. Advantageously, these low profile sensor assemblies 40 allow an occupant to sit more comfortably upon the vehicle seat 10.

One embodiment of the low profile sensor assembly is shown in detail in FIG. 2. The low profile sensor assembly 40 generally includes a housing 44, having a base 46, an upper slide member 48, and an intermediate guide member 50 disposed between the upper slide member 48 and the base 46. The upper slide member 48 and the intermediate guide member 50 are both supported for movement toward and away from the base 46. A biasing member 52 acts to bias the upper slide member 48 and intermediate guide member 50 away from the base 46 as will be described in greater detail below.

In the preferred embodiment illustrated in these figures, the base 46 includes a base guide 54, which is shaped like a hollow tube so as to define a wall 56 with a bore 58 extending axially therethrough. The upper slide member 48 includes an upper disc portion 60 and a support wall 62 extending axially downward from the outer circumference of the upper disc portion 60. The support wall 62 has a smaller diameter than the diameter of the intermediate guide member 50 such that the upper slide member 48 can move axially through the intermediate guide member 50. The biasing member 52 is disposed between the base 46 and the upper disc portion 60 of the upper slide member 48.

The intermediate guide member 50 is operatively supported for axial movement between the base 46 and the upper slide member 48. To this end, the intermediate guide member 50 is substantially tubular so as to define an outer surface 64 and an inner surface 66. The diameter of the intermediate guide member 50 is smaller than the diameter of the bore 58 of the base guide 54 such that the intermediate guide member 50 can move axially through the bore 58.

The intermediate guide member 50 includes a lower flange 68 formed on its lower end, and the base 46 includes an upper flange 70 formed on the upper end of the base guide 54. In the embodiment shown, the lower flange 68 of the intermediate guide member 50 extends radially outward, and the upper flange 70 of the base 46 extends radially inward. The diameter of the lower flange 68 is larger than the diameter of the upper flange 70. As such, the intermediate guide member 50 can be positioned within the bore 58 of the base guide 54. As the lower flange 68 of the intermediate guide member 50 slides toward the upper flange 70, the upper flange 70 interferes with the lower flange 68, thereby inhibiting further upward movement of the intermediate guide member 50. Thus, the upper flange 70 on the base 46 and the lower flange 68 on the intermediate guide member 50 cooperate to define the limit of sliding movement of the intermediate guide member 50 away from the base 46.

The upper slide member 48 includes a lower flange 72 formed on its lower end. On the other hand, the intermediate guide member 50 includes an upper flange 74 formed on its upper end. In the embodiment shown, the lower flange 72 of the upper slide member 48 extends radially outward, and the upper flange 74 of the intermediate guide member 50 extends radially inward. The diameter of the lower flange 72 is larger than the diameter of the upper flange 74. As such, the upper slide member 48 can be positioned within the intermediate guide member 50. As the lower flange 72 of the upper slide member 48 slides toward the upper flange 74 under the influence of the biasing force generated by the biasing member 52, the upper flange 74 interferes with the lower flange 72, thereby inhibiting further upward movement of the upper slide member 48. Thus, the upper flange 74 on the intermediate guide member 50 and the lower flange 72 on the upper slide member 48 cooperate to define the limit of sliding movement of the upper slide member 48 away from the base 46.

Furthermore, the upper slide member 48 includes a retainer 76 extending in the general direction of the base 46. In the embodiment shown, the retainer 76 is cup-shaped and extends from the center of the upper disc portion 60 of the upper slide member 48 in the direction of the base 46. In the embodiment shown in FIGS. 3 and 4, the sensor assemblies include an emitter 78, such as a magnet, which is operatively contained in and supported by the retainer 76.

As noted above, the vehicle occupant sensing system 28 further includes at least one sensor 42. The sensor 42 is operatively supported by the circuit carrier 32 adjacent the sensor assembly 40. In the embodiment shown here, the sensor 42 is positioned below the base 46 of the sensor assembly 40. The sensor 42 can be one of many types, including but not limited to a Hall effect sensor. If the sensor 42 is a Hall effect sensor, it detects the change in magnetic flux caused by the movement of the emitter 78 within the upper slide member 48 of the sensor assembly 40, and the sensor 42 generates a signal correlative of this change in magnetic flux. In this way, the sensor 42 is adapted to detect a condition of the vehicle seat assembly 10, such as whether or not it is occupied or whether the occupant is sitting in a certain position, based on the response of the sensor assembly 40. The signals generated by the sensor 42 are carried through the electric circuit 34 to the controller 36, which sends output to the restraint system 38 based on the signals generated by the sensor 42.

The weight of an occupant will deform the seat cushion 16 such that the lower surface 20 of the seat cushion 16 pushes the upper slide member 48 toward the base 46. The movement of the upper slide member 48 defines a force responsive axis 80. As the upper slide member 48 moves, the sensor 42 detects an increase in magnetic flux density generated by the approaching emitter 78. In this way, the sensor 42 is operable to detect movement of the upper slide member 48 toward and away from the base 46. In turn, the sensor 42 generates a responsive signal indicative of the increase in flux density, and the controller 36 sends output to the restraint system 38 based on these signals. In the preferred embodiment, the sensor assemblies 40 are of the type described in detail in applicant's co-pending patent application Ser. No. 10/748,536, entitled "Vehicle Occupant Sensing System Having a Low Profile Sensor Assembly," and which is incorporated herein in its entirety by reference.

The seat pan 26 includes a substantially flat main body 82 that defines a forward portion 84 and a rear portion 86. The seat pan 26 is positioned such that the rear portion 86 is disposed closer to the seat back 12 than the forward portion 84. The rear portion 86 of the seat pan 22 is substantially horizontal and parallel to the upper surface 18 of the seat cushion 16. Also, the forward portion 84 of the seat pan 26 is disposed at a positive angle relative to the horizontal plane of the rear portion 86 of the seat pan 26. Angling the forward portion 84 allows the seat pan 26 to more effectively bear forward inertial loads of the occupant during a sudden deceleration, such as those experienced in a frontal collision. This reduces the risk of injury otherwise caused when the forward inertial loads force the occupant off of the front of the seat cushion 16 and is one example of a design component calculated for compliance with governmental motor vehicle safety standards, such as 49 C.F.R. §§ 571.207–208 (2003).

The seat pan 26 also includes at least one bolster 88. In the embodiment shown, there are two bolsters 88 which each extend upward toward the lower surface 20 of the seat cushion 16, and each are formed spaced from the main body 82 of the seat pan 26. Specifically, each bolster 88 is attached to opposite sides of the main body 82 so as to be disposed under the inboard side 22 and outboard side 24 of the seat cushion 16, respectively.

Figure 3:
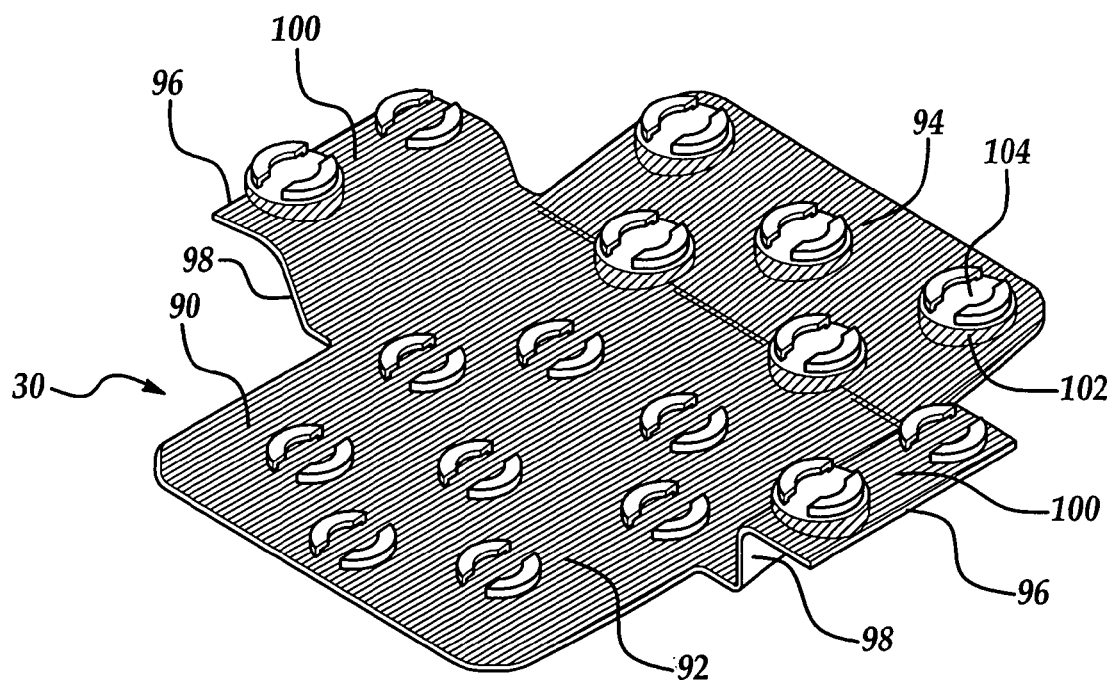
FIG. 3 is a perspective view of the circuit carrier tray of the vehicle occupant sensing system of the present invention.

As noted above, the vehicle seat assembly 10 includes a circuit carrier tray 30, which is shown specifically in FIG. 3. The tray 30 is adapted to be disposed between the seat pan 26 and the seat cushion 16. In one embodiment, the tray 30 is made out of a rigid plastic material. The tray 30 has a main body portion 90 that is substantially flat and shaped so as to correspond with the main body 82 of the seat pan. Specifically, the main body portion 90 of the tray 30 includes a rear portion 92 that is substantially horizontal and parallel to the upper surface 18 of the seat cushion 16 so as to correspond to the rear portion 86 of the seat pan 26. The main body portion 90 of the tray 30 also includes a forward portion 94 that is disposed at a positive angle relative to a horizontal plane of the rear portion 92 of the tray 30 so as to correspond to the forward portion 84 of the seat pan 26.

The tray 30 also includes at least one bolster 96. In the embodiment shown, there are two bolsters 96, each L-shaped so as to define a vertical portion 98 and a horizontal portion 100. The vertical portion 98 of each bolster 96 is attached at opposite sides of the main body portion 90 such that the horizontal portion 100 of each bolster 96 is spaced vertically from the main body portion 90 of the tray 30. The tray 30 is positioned such that each bolster 96 corresponds with at least one bolster 88 of the seat pan 26. More specifically, the tray 30 is positioned on the seat pan 26 such that the main body portion 90 of the tray 30 lays flat on the main body 82 the seat pan 26 and the horizontal portion 100 of each bolster 96 of the tray 30 extends upward to lay flat on the corresponding bolster 88 of the seat pan 26.

Moreover, the tray 30 includes a plurality of pedestals 102 formed thereon. At least some of the pedestals 102 are formed on the forward portion 94 of the tray 30. In the preferred embodiment shown here, the pedestals 102 are tubular-shaped and each pedestal 102 extends vertically from the forward portion 94 of the tray 30. The pedestals 102 each define a substantially flat top surface 104 spaced away from the main body portion 90 of the tray 30. In the embodiment shown, each pedestal 102 extends at a positive angle relative to the plane of the forward portion 94 such that the plane of each top surface 104 is substantially parallel with the rear portion 92 of the tray 30. Although the pedestals 102 are shown integrally attached to the tray 30, one having ordinary skill in the art will recognize that the pedestals 102 could be separate from the rest of the tray 30 without departing from the spirit of the invention.

In the preferred embodiment, a pedestal 102 is also formed on each bolster 96. Specifically, this pedestal 102 is defined near the rear of the horizontal portion 100 of each bolster 96. The pedestals 102 on the bolsters 96 extend at a positive angle relative to the plane of the rear of the horizontal portion 100 of the respective bolster 96 such that the top surface 104 of these pedestals 102 are substantially parallel with the rear portion 92 of the tray 30.

As shown in FIG. 1, the circuit carrier 32 also includes a plurality of slits 106 extending through the circuit carrier 32 such that each slit 106 defines a flap 108 of the circuit carrier 32. Each of the slits 106 is cut in the form of a partial ellipse and is spaced according to the spacing of the pedestals 102. As such, when the circuit carrier 32 is positioned on the tray 30, the flaps 108 of the circuit carrier 32 lay directly on the top surface 104 of each pedestal 102 while the remaining portions of the circuit carrier 32 lie flat on the remaining portions of the tray 30.

In the embodiment shown, the sensor assemblies 40 are positioned on the rear portion 92, the forward portion 94, and on the bolsters 96 of the tray 30. At least some of the sensor assemblies 40 positioned on the forward portion 94 the tray 30 are positioned on the top surface 104 of the pedestals 102. The sensor assemblies 40 positioned on the rear of the bolsters 96 are also positioned on the top surface 104 of the respective pedestals 102. Specifically, in the embodiment shown, each of the pedestals 102 supports one sensor assembly 40.

The tray 30 supports each sensor assembly 40, with the upper slide member 48 in close proximity to the lower surface 20 of the seat cushion 16. As noted above, when an occupant sits on the upper surface 18 of the seat cushion 16, the occupant's weight transfers through the seat cushion 16, causing the lower surface 20 to move toward the upper slide members 48 and depress them into the respective base 46. Movement of the upper slide members 48 causes the respective sensors 42 to generate the correlating signals, which are sent through the electric circuit 34 to the controller 36. The controller 36 sends output to the restraint system 38 based on these signals.

Thus, the vehicle occupant sensing system 28 responds when an occupant is present in the vehicle seat assembly 10 because some or all of the upper slide members 48 are depressed, and a person of a certain weight will depress the upper slide members 48 a predetermined amount, causing a predetermined signal response from the sensors 42. Similarly, when the vehicle seat assembly 10 is vacant, all of the sensor assemblies 40 are at a free height, causing another predetermined signal response from the sensors 42. Also, when the occupant is seated in a certain way, a number of upper slide members 48 are depressed in a certain pattern, causing a predetermined signal response from the sensors 42. In this way, the sensor assemblies 40 are responsive to the condition of the vehicle seat assembly 10, and the controller 36 can send output to the restraint system 38 based on these predetermined signal responses. However, one having ordinary skill in the art will recognize that the vehicle occupant sensing system 28 could be responsive to any one of a plurality of vehicle seat conditions without limiting the present invention.

It is understood that shear forces can have a detrimental effect on the effectiveness of the sensor assemblies 40. As such, the upper slide members 48 of the sensor assemblies 40 are designed to travel substantially along the force responsive axis 80 only. In this way, position changes between the emitter 78 and the corresponding sensor 42 occur linearly along the force responsive axis 80. Thus, in the preferred embodiment, the sensor assemblies 40 perform more effectively when the corresponding force responsive axis 80 is aligned with the axial load induced by the occupant through the seat cushion 16.

Therefore, the sensor assemblies 40 positioned on the rear portion 92 of the tray 30 are attached such that the respective force responsive axes 80 are aligned with the axial load. Specifically, because the plane defined by the rear portion 92 of the tray 30 is substantially perpendicular with the axial load of the occupant, the sensor assemblies 40 positioned on the rear portion 92 are attached with the force responsive axes 80 perpendicular thereto. Moreover, the sensor assemblies 40 attached to the pedestals 102 are attached such that the corresponding force responsive axes 80 are substantially aligned with the axial load applied by the occupant. Specifically, although the forward portion 94 of the tray 30 is angled with respect to the axial load applied by the occupant, the pedestals 102 located on the forward portion 94 are attached to the forward portion 94 such that the top surfaces 104 of the pedestals 102 are substantially perpendicular to the axial load of the occupant, and the sensor assemblies 40 are attached to the respective top surfaces 104 with the respective force responsive axis 80 perpendicular thereto. Similarly, the pedestals 102 attached to the bolsters 96 are attached thereto such that the respective top surfaces 104 are substantially perpendicular to the axial load of the occupant, and the sensor assemblies 40 are attached to the respective top surfaces 104 with the respective force responsive axis 80 perpendicular thereto. As such, each of the sensor assemblies 40 attached to the pedestals 102 are aligned with the axial load applied by the occupant, and the effects of shear forces on those sensor assemblies 40 are decreased.

Advantageously, the sensor assemblies 40 positioned on the pedestals 102 are more likely to respond accurately to the presence of the occupant in the vehicle seat assembly 10. Therefore, the forward portion 84 of the seat pan 26 can be angled such that the vehicle seat assembly 10 retains the occupant more effectively, and yet the sensor assemblies 40 located in this area are properly aligned to effectively respond to weight loads applied by the occupant. Similarly, the bolsters 96 of the tray 30 can be angled to conform to the bolsters 88 of the seat pan 26, and yet the sensor assemblies 40 located in this area are properly aligned to effectively respond to weight loads applied by the occupant.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A vehicle occupant sensing system for detecting a condition of a vehicle seat assembly, wherein the vehicle seat assembly has a lower seat cushion on which an occupant can apply an axial load directed generally through the lower seat cushion, and a seat pan that supports the lower seat cushion, said vehicle occupant sensing system comprising:

a tray adapted to be disposed between the seat pan and the cushion, said tray including a plurality of pedestals formed thereon; and a plurality of sensor assemblies operatively disposed between the lower seat cushion and said tray, each of said sensor assemblies defining a force responsive axis, said sensor assemblies responsive to the condition of the vehicle seat assembly, at least some of said sensor assemblies supported by corresponding ones of said plurality of pedestals such that said force responsive axes of said sensor assemblies are substantially aligned with the axial load applied by the occupant.

2. A vehicle occupant sensing system as set forth in claim 1, wherein said tray includes a forward portion that corresponds to a forward portion of the seat pan and wherein at least some of said pedestals are formed on said forward portion of said tray.

3. A vehicle occupant sensing system as set forth in claim 2, wherein said tray further includes a rear portion that corresponds to a rear portion of the seat pan, wherein said forward portion is disposed at a positive angle relative to a horizontal plane of said rear portion of said tray.

4. A vehicle seat assembly as set forth in claim 1, wherein said tray has a main body portion that corresponds with a main body of the seat pan, and at least one bolster formed spaced from said main body portion of said tray so as to correspond with at least one bolster of said seat pan.

5. A vehicle occupant sensing system as set forth in claim 4, wherein at least one of said plurality of pedestals is formed on said at least one bolster.

6. A vehicle occupant sensing system as set forth in claim 1, wherein said sensor assemblies each comprise a housing including a base and an upper slide member supported for movement toward and away from said base, wherein movement of said upper slide member defines the force responsive axis.

7. A vehicle occupant sensing system as set forth in claim 1, wherein said pedestals each include an annular attachment tab to attach said sensor assemblies thereto.

8. A vehicle occupant sensing system as set forth in claim 1 further comprising a circuit carrier supported by said tray, said circuit carrier including a plurality of slits corresponding to said pedestals.

9. A vehicle occupant sensing system as set forth in claim 1, wherein said plurality of pedestals each defines a top surface spaced away from a main body portion of said tray, said top surfaces supporting at least one of said plurality of sensor assemblies.

10. A vehicle seat assembly comprising:

a seat back;

a lower seat cushion defining an upper surface and a lower surface, wherein an occupant can apply an axial load directed generally through said lower seat cushion;

a seat pan that supports said lower seat cushion;

a tray adapted to be disposed between the seat pan and the lower seat cushion, said tray including a plurality of pedestals formed thereon; and a plurality of sensor assemblies operatively disposed between the lower seat cushion and said tray, each of said sensor assemblies defining a force responsive axis, said sensor assemblies responsive to a condition of the vehicle seat assembly, at least some of said sensor assemblies supported by corresponding ones of said plurality of pedestals such that said force responsive axes of said sensor assemblies are substantially aligned with the axial load applied by the occupant.

11. A vehicle seat assembly as set forth in claim 10, wherein said tray includes a forward portion that corresponds to a forward portion of said seat pan, and wherein at least some of said pedestals are formed on said forward portion of said tray.

12. A vehicle occupant sensing system as set forth in claim 11, wherein said tray further includes a rear portion that corresponds to a rear portion of said seat pan, wherein said forward portion is disposed at a positive angle relative to horizontal plane of said rear portion of said tray.

13. A vehicle seat assembly as set forth in claim 10, wherein said tray has a main body portion that corresponds with a main body of said seat pan, and at least one bolster formed spaced from said main body portion of said tray so as to correspond with at least one bolster of said seat pan.

14. A vehicle seat assembly as set forth in claim 13, wherein at least one of said plurality of pedestals is formed on said at least one bolster.

15. A vehicle seat assembly as set forth in claim 10, wherein said sensor assemblies each comprise a housing including a base and an upper slide member supported for movement toward and away from said base, wherein movement of said upper slide member defines the force responsive axis.

16. A vehicle occupant sensing system as set forth in claim 10, wherein said pedestals each include an annular attachment tab to attach said sensor assemblies thereto.

17. A vehicle occupant sensing system as set forth in claim 10 further comprising a circuit carrier supported by said tray, said circuit carrier including a plurality of slits corresponding to said pedestals.

18. A vehicle occupant sensing system as set forth in claim 10, wherein said plurality of pedestals each defines a top surface spaced away from a main body portion of said tray, said top surfaces supporting at least one of said plurality of sensor assemblies.

* * * * *